(12) United States Patent
Gaudillat

(10) Patent No.: US 7,212,533 B2
(45) Date of Patent: May 1, 2007

(54) METHOD OF MANAGING A TELECOMMUNICATION NETWORK AND A NETWORK MANAGEMENT UNIT FOR IMPLEMENTING THE METHOD

(75) Inventor: Hervé Gaudillat, Petaluma, CA (US)

(73) Assignee: Alcatel, Paris (FR)

( * ) Notice: Subject to any disclaimer, the term of this patent is extended or adjusted under 35 U.S.C. 154(b) by 963 days.

(21) Appl. No.: 09/871,816

(22) Filed: Jun. 4, 2001

(65) Prior Publication Data
US 2002/0021666 A1    Feb. 21, 2002

(30) Foreign Application Priority Data
Jun. 5, 2000    (FR)    ................... 00 07141

(51) Int. Cl.
*H04L 12/54* (2006.01)
(52) U.S. Cl. .................................. 370/395.2
(58) Field of Classification Search ............... 370/230, 370/230.1, 231, 236, 255, 259, 260, 261, 370/322, 351, 352, 395.2, 395.21, 395.3, 370/395.4, 395.41, 443, 468, 522; 725/87–104
See application file for complete search history.

(56) References Cited

U.S. PATENT DOCUMENTS

| 6,092,113 | A  | * | 7/2000 | Maeshima et al. .......... 709/230 |
| 6,115,382 | A  | * | 9/2000 | Abe ........................ 370/395.3 |
| 6,434,164 | B1 | * | 8/2002 | Matsunaga et al. ......... 370/443 |
| 6,584,097 | B1 | * | 6/2003 | Malik ........................ 370/352 |

FOREIGN PATENT DOCUMENTS

| EP | 0 781 068 A1 | 6/1997 |
| EP | 1 001 574 A1 | 5/2000 |

* cited by examiner

*Primary Examiner*—Melvin Marcelo
(74) *Attorney, Agent, or Firm*—Sughrue Mion, PLLC

(57) ABSTRACT

A telecommunication network management method and unit are disclosed. Connection requests are received and the possibility of setting up a connection is determined from parameters including time parameters in the form of time intervals. The connections database is updated allowing for the time parameters. The method finds applications in telecommunication networks.

8 Claims, 1 Drawing Sheet

METHOD OF MANAGING A TELECOMMUNICATION NETWORK AND A NETWORK MANAGEMENT UNIT FOR IMPLEMENTING THE METHOD

CROSS-REFERENCE TO RELATED APPLICATIONS

This application is based on French Patent Application No. 00 07 141 filed Jun. 5, 2000, the disclosure of which is hereby incorporated by reference thereto in its entirety, and the priority of which is hereby claimed under 35 U.S.C. §119.

BACKGROUND OF THE INVENTION

1. Field of the invention

The invention relates to a telecommunication network management method. It also relates to a network management unit implementing the method. The invention applies to managing the availability and use of physical resources.

2. Description of the prior art

Managing a telecommunication network requires an information system able to supply knowledge of physical resources, namely the resources of the network elements (NE), also referred to as nodes, their termination points and the properties of their termination points (more specifically capacity in terms of bandwidth, the maximum number of switchpaths and the available switchpath identifiers).

The termination points are called access points in an asynchronous transfer mode (ATM) network.

The termination points of a network element have technical characteristics having properties dedicated to the connectivity aspect. The remainder of this disclosure is concerned with these properties. They include the capacity in terms of bandwidth (input bandwidth, output bandwidth); the capacity in terms of the maximum number of switchpaths and the available switchpath identifiers may also be cited.

The information system is based on three-levels of software.

A first level is called the equipment management layer (EML). This is for the most part the application layer responsible for the interface with the network element (NE). This layer provides a knowledge of the status of the network element and is used to send management commands to the element.

A second level is called the network management layer (NML). This is the layer for controlling the switchpaths enabling calls to be set up within a network.

A third level is called the services management layer (SML). This is the layer dedicated to managing services. For example, it is used to manage private networks using the network of a telecommunications operator.

The invention is located at the interface of the NML and SML, as shown diagrammatically in FIG. 1.

It provides all users with a real time view of the resources that are available and that are in use in the short term and in the long term.

In particular, it enables periodic or aperiodic reservation of some or all of the capacity offered by a physical telecommunication resource (for example, the bandwidth capacity offered for each termination point of a node and/or the capacity offered in terms of the maximum number of switchpaths and the capacity offered in terms of identifiers for each termination point of that node).

At present, network management systems manage the paths/connections between the network elements, but most of-them operate on the principle of real time creation/reservation and suppression.

The prior art systems are no longer suitable because of the increasing demand for network capacity and in particular for capacity in terms of bandwidth and the number of switch points.

Moreover, because of the development of new services, such as management of virtual private networks (VPN), requirements for operator assistance are increasing, in particular in the provision of network quality of service management services.

What is more, because of developments in traffic engineering, constraintbased routing algorithms need to rely on services managing availability and use of resources to optimize routing (from the routing point of view, bandwidth is seen as a constraint rather than a resource property).

The invention solves the above problem.

SUMMARY OF THE INVENTION

To this end, the invention provides a method of managing a telecommunication network including:
  receiving connection requests, the connections being determined on the basis of parameters contained in the requests and including time parameters,
  verifying the possibility of setting up the connections in accordance with the parameters, on the basis of a database in which all connections are stored, and
  updating the database if the connection is possible.

According to one feature of the method the time parameters correspond to series of time intervals which can have a periodic character.

In this case the time parameters can take the form of a daily and/or weekly and/or monthly and/or annual periodic duration.

According to another feature the time parameters can correspond to series of time intervals having an aperiodic character.

In this case the time parameters include data corresponding to an absolute time (instant) and a finite or indefinite duration.

Updating of available connections in the database allows for the time parameters.

The invention also provides a telecommunication network management unit including:
  means for receiving connection requests, the connections being determined on the basis of parameters contained in the requests and including time parameters,
  means for verifying the possibility of setting up the connections in accordance with the parameters, on the basis of a database in which all connections are stored,
  means for updating the database accordingly, and
  means for reserving connections allowing for time parameters.

According to another feature the unit includes means for updating connections in the network according to the content of the database, which contains reservations allowing for time parameters.

Other features and advantages of the invention will become clearly apparent on reading the following description, which is given with reference to the accompanying drawings.

DETAILED DESCRIPTION OF THE PREFERRED EMBODIMENT

Figure 1:
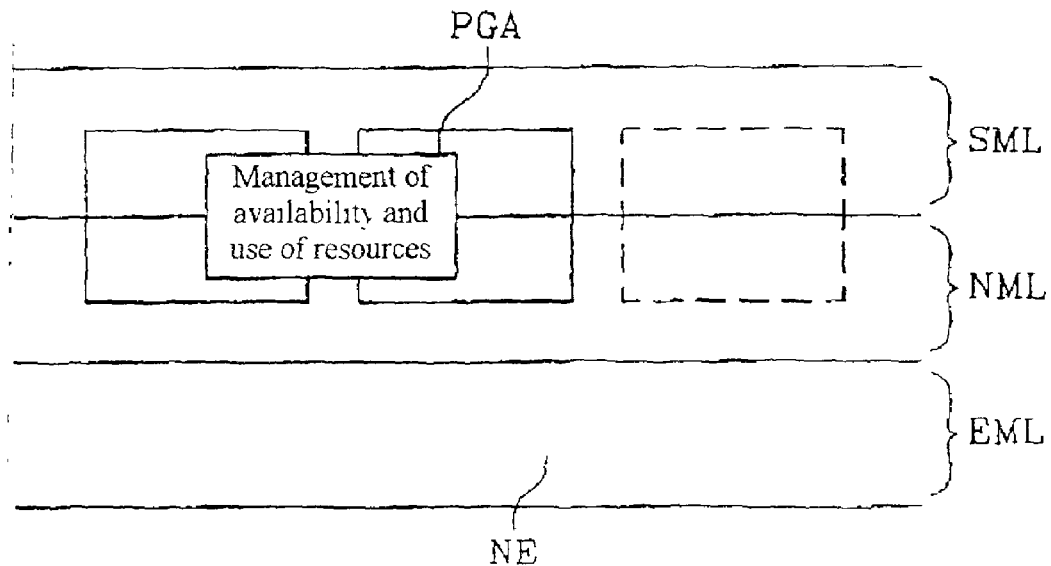
FIG. 1 is a diagram showing a prior art management system with three logical network management layers and indicating the location at which the invention is implemented.

As shown in FIG. 1, the proposed management system includes a software layer dedicated to managing time parameters.

The time parameters can take the form of a series of relative time intervals repeated on a daily and/or weekly and/or monthly and/or annual basis for managing services. This layer is implemented in the services management layer (SML).

Figure 2:
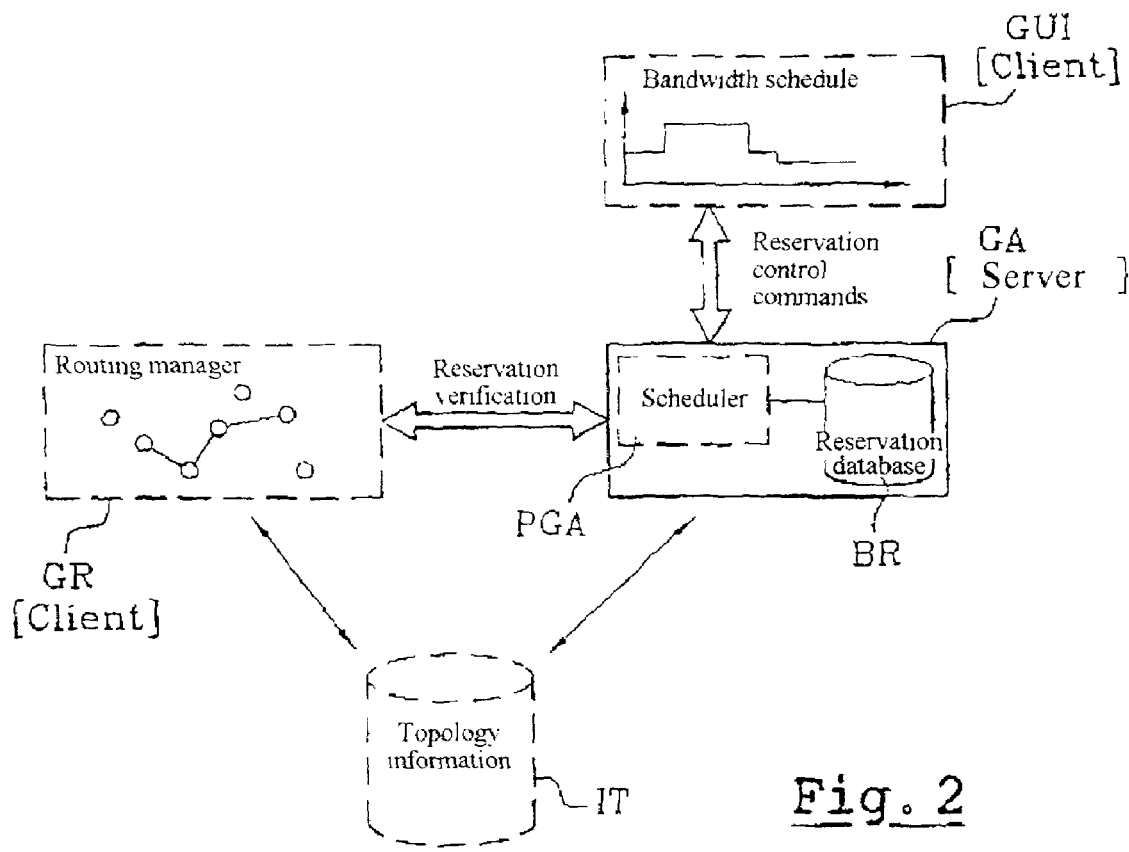
FIG. 2 shows a software architecture for implementing the method according to the invention.

The method according to the invention is implemented by the software architecture shown in FIG. 2.

That architecture includes a scheduler GA for the availability and use of the capacities offered by the telecommunication resources; capacities in terms of bandwidth of a termination point and/or capacity in terms of a maximum number of switchpaths and capacity in terms of available switchpath identifiers.

The architecture takes the form of a server which has a scheduler program PGA and a reservation database BR. The properties managed by the program are typically the capacity in terms of bandwidth, the capacity in terms of the maximum number of switchpaths, and the capacity in terms of available switchpath identifiers assigned of the termination points of the network elements.

The scheduler GA communicates with a database IT of the NML, which supplies it with topological information on the network element concerned, namely the input and output termination points of that element and their characteristics.

Client programs of the scheduler server GA communicate with that server.

The routing manager client program GR can, by interrogating the server, verify the availability of resources for the paths that it wishes to set up and switchpath reservations.

The graphical user interface (GUI) client program can, by interrogating the server, find out the schedules for reserving a capacity of a resource.

The invention can therefore manage the availability and use of resources, allowing for time parameters (introduction of time constraints). This provides for interrogating and/or modifying the schedules for the availability and use of the resources of the network elements.

The services provided are:
 verifying the possibility of reserving a resource on the basis of time constraints and/or technical constraints such as bandwidth, an available switchpath identifier;
 reserving resources on the basis of time constraints and/or technical constraints such as a bandwidth and an available switchpath identifier;
 no reservation if it is not possible;
 obtaining for a resource the available bandwidth and/or switchpath identifiers on the basis of a time constraint;
 obtaining for a resource ranges or periods of time available on the basis of a technical constraint such as bandwidth and/or an available switchpath identifier.

The management unit can additionally provide the following services:
 reserving multiple resources,
 reserving and simultaneously verifying a set of resources, and
 supplying the best available resource from a set of resources.

The unit is also able to manage different types of time parameter:
 permanent (an indefinite duration beginning at a given time);
 aperiodic (a finite duration beginning at a given time);
 weekly periodic (series of relative time intervals that are reproduced every week);
 daily periodic (series of relative time intervals that are reproduced every day).

The mechanism in accordance with the invention for verifying the availability and use of resources on the basis of the time constraint is described in more detail below:

A1) Consider in consequence the scheduling of use of a resource:

Each property of a resource (for example capacity in terms of input bandwidth of a termination point) has its schedule of use, as just described.

The schedule includes a "list of series of transitions". A transition is an object having an absolute time value, an up/down sign, an amplitude value.

A2) Detailed description of the "series of transitions":

Regardless of its type (aperiodic, periodic), a series of transitions object is made up of a finite number of time intervals which are in turn divided into two transitions of the same amplitude (one up and one down).

Each transition also has its time value (YY/MM/DD/HH/MM/SS) and its sign (up or down) and carries a value defining its amplitude (for example, 10 cells per second in the case of an asynchronous transfer mode (ATM) network).

A3) The principle of the verification mechanism is as follows:

In the first step, for each property of the resource tested, the transitions from the current schedule of use are mixed with those from the list of transitions resulting from the time constraint which is one of the input parameters of the "resource availability verification" operation.

Then, on the basis of that list, and in the upward time direction (starting from the oldest transition), the following procedure is applied at each transition:
 Step 2.1: add or subtract the amplitude to or from the current value (according to the sign of the transition).
 Step 2.2: verify that the capacity has not been reached (only for upward transitions).
 Step 2.3: if the capacity has been reached, the corresponding transition is stored to supply a maximum of elements on the transitions and the "erroneous" time intervals, i.e. those during which the capacity of the resource is exceeded.
 Step 2.4: go to the next transition with the new current value.

It is possible to optimize the processing as follows:

B.1) Optimization to test only the necessary transitions.

Before proceeding to the second step (mixing of input transitions and transitions corresponding to the current occupancy), the time intervals of the use schedule that have no impact on the operation of verifying the availability of the resource are ignored, namely:
 those terminating before the beginning of the input subsystem,
 those beginning after the end of the input subsystem.

B.2) Various types of properties (capacity in terms of bandwidth, capacity in terms of the maximum number of switchpaths and capacity in terms of available switchpath identifiers).

Steps 2.1 and 2.2 (capacity test) differ according to the capacity type, as follows:

For a "type 1" capacity (for example maximum bandwidth, or maximum number of switchpaths), it is sufficient to manage a single variable (for example an integer) that is incremented on each transition according to the amplitude of the transition and tested afterwards.

For a "type 2" capacity (for example a table of available switchpath identifiers, i.e. a finite set of available identifier values), it is necessary to maintain upto-date a table for determining the free values and reciprocally those values which are not free. Accordingly, on each upward transition, it is necessary to verify in this table if the value carried by the transition has already been used or not. If "the place was free" it is immediately occupied and is released only on the corresponding downward transition.

The invention claimed is:

1. A method of managing a telecommunication network including:
   receiving connection requests, said connections being determined on the basis of parameters contained in said requests and including time parameters,
   verifying the possibility of setting up the connections in accordance with said parameters, on the basis of a database in which all connections are stored, and
   updating said database if setting up said connection is possible,
   wherein the step of receiving connection requests, the step of verifying the possibility of setting up the connections, and the step of updating said database are performed by a scheduler program which spans a services management layer and a network management layer.

2. The network management method claimed in claim 1 wherein said time parameters correspond to series of time intervals having a periodic character.

3. The network management method claimed in claim 2 wherein said time parameters take the form of a duration of uses/reservations repeated daily and/or weekly and/or monthly and/or annually.

4. The network management method claimed in claim 1 wherein said time parameters correspond to series of time intervals having an aperiodic character.

5. The network management method claimed in claim 4 wherein said time parameters include data corresponding to an absolute time and a finite or indefinite duration.

6. The network management method claimed in claim 1 wherein the updating of available connections in said database allows for said time parameters.

7. A telecommunication network management unit including:
   means for receiving connection requests, said connections being determined on the basis of parameters contained in said requests and including time parameters,
   means for verifying the possibility of setting up the connections in accordance with said parameters, on the basis of a database in which all calls are stored,
   means for updating said database accordingly, and
   means for reserving connections allowing for time parameters,
   wherein the means for receiving connection requests spans a services management layer and a network management layer.

8. The network management unit claimed in claim 7 including means for updating connections in said network according to the content of said database, which contains reservations allowing for time parameters.

* * * * *